United States Patent [19]  
Homan et al.

[11] 4,284,539  
[45] Aug. 18, 1981

[54] COMPOSITIONS INCLUDING MERCAPTOORGANOPOLYSILOXANES, ALIPHATICALLY UNSATURATED POLYDIORGANOSILOXANES AND CARBOXYLIC ACID SALTS OF METALS

[75] Inventors: Gary R. Homan; Chi-Long Lee, both of Midland, Mich.

[73] Assignee: Dow Corning Corporation, Midland, Mich.

[21] Appl. No.: 99,257

[22] Filed: Dec. 3, 1979

[51] Int. Cl.$^3$ ............................................. C08L 91/00
[52] U.S. Cl. ............................. 260/18 S; 260/37 SB; 528/15; 528/19; 528/32; 528/33; 528/30
[58] Field of Search ......................... 260/18 S, 37 SB; 528/15, 19, 32, 33, 30

[56] References Cited

U.S. PATENT DOCUMENTS

| | | | |
|---|---|---|---|
| 3,445,419 | 5/1969 | Vanderlinde | 260/37 |
| 3,655,713 | 4/1972 | LeGrow | 260/448.2 N |
| 3,816,282 | 6/1974 | Viventi | 204/159.13 |
| 3,873,499 | 3/1975 | Michael et al. | 204/159.13 |
| 4,039,504 | 8/1977 | Homan et al. | 260/37 SB |
| 4,039,505 | 8/1977 | Homan et al. | 260/37 SB |
| 4,064,027 | 12/1977 | Gant | 204/159.13 |
| 4,066,603 | 1/1978 | Homan et al. | 260/37 SB |
| 4,070,328 | 1/1978 | Homan et al. | 260/37 SB |
| 4,070,329 | 1/1978 | Homan et al. | 260/37 SB |

FOREIGN PATENT DOCUMENTS 2008426 2/1970 Fed. Rep. of Germany .

Primary Examiner—Melvyn I. Marquis  
Attorney, Agent, or Firm—Roger H. Borrousch

[57] ABSTRACT

Oxygen curable compositions are provided by mixing mercaptoorganopolysiloxane, aliphatically unsaturated polydiorganosiloxane and a metal salt of a carboxylic acid, where the metal is iron, manganese, or nickel.

6 Claims, No Drawings

COMPOSITIONS INCLUDING MERCAPTOORGANOPOLYSILOXANES, ALIPHATICALLY UNSATURATED POLYDIORGANOSILOXANES AND CARBOXYLIC ACID SALTS OF METALS

BACKGROUND OF THE INVENTION

1. Field of the Invention

This invention relates to oxygen curable compositions including mercaptoorganopolysiloxanes, aliphatically unsaturated polydiorganosiloxanes and carboxylic acid salts of metals.

2. Description of the Prior Art

Applicants' U.S. Pat. Nos. 4,039,504 and 4,039,505 are generally directed to compositions curable to elastomers at room temperature or with heat. These compositions are prepared from mixtures of certain polymethylvinylsiloxanes and mercaptoorganopolysiloxanes with an organic peroxide, and optionally a filler.

Applicants' U.S. Pat. No. 4,070,329 discloses compositions prepared from mixtures of mercaptoorganopolysiloxanes, and organic peroxide catalysts. Applicants' U.S. Pat. No. 4,070,328 discloses compositions prepared from mixtures of mercaptoorganopolysiloxanes, organic hydroperoxide, and selected nitrogen compounds. The compositions prepared according to these references can be used as sealants which rapidly cure to elastomers with non-tacky surfaces.

Numerous other prior art references are directed to compositions involving mercaptoorganopolysiloxanes and mixtures thereof with alkenyl-containing siloxanes as well as to curing systems employing electromagnetic and particulate radiation. These references include: U.S. Pat. No. 3,445,419; U.S. Pat. No. 3,816,282; U.S. Pat. No. 3,873,499; German patent publication (OLS) 2,008,426; U.S. Pat. No. 4,064,027; U.S. Pat. No. 4,066,603; and U.S. patent application Ser. No. 663,326, filed Mar. 3, 1976, by Gary N. Bokerman and Robert E. Kalinowski, entitled "Method of Curing Thick Section Elastomers" and assigned to the same assignee as the present invention. The disclosures of the above-identified patents and applications are specifically incorporated by reference herein for the purpose of exemplifying the state of the prior art.

Although the prior art describes elastomeric materials formed by mixing mercaptoorganopolysiloxanes with alkenyl-containing polysiloxanes and organic peroxides, by mixing mercaptoorganopolysiloxanes with organic peroxides alone, or by mixing mercaptoorganopolysiloxanes with organic hydroperoxides and selected nitrogen compounds, it was not expected that useful materials, including elastomeric materials, could be provided by mixing, at room temperature, aliphatically unsaturated polydiorganosiloxanes, mercaptoorganopolysiloxanes and certain metal salts of carboxylic acids. Nor was it expected that these metal salts, when used in mixtures of aliphatically unsaturated polydiorganosiloxanes, mercaptoorganopolysiloxanes and organic peroxides would substantially increase the rate of curing of the mixture to provide elastomeric compositions.

SUMMARY OF THE INVENTION

According to the present invention, novel compositions of matter are provided by mixing mercaptoorganopolysiloxanes and aliphatically unsaturated polydiorganosiloxanes with carboxylic acid salts of a metal selected from the group consisting of iron, manganese and nickel. Included among the compositions provided according to the invention are compositions curable to elastomers at room temperature in the presence of an oxygen-containing atmosphere such as air. Curable compositions of the invention may optionally include fillers and provide sealants which cure rapidly to elastomeric materials with non-tacky surfaces. Compositions additionally including an organic peroxide cure to elastomers in a shorter time than similar compositions not containing the metal compounds.

DESCRIPTION OF THE INVENTION

This invention relates to a curable composition comprising a material prepared by mixing:

(A) a mercaptoorganopolysiloxane consisting essentially of a combination of units selected from dimethylsiloxane units, hydroxydimethylsiloxane units, trimethylsiloxane units, units of the formula

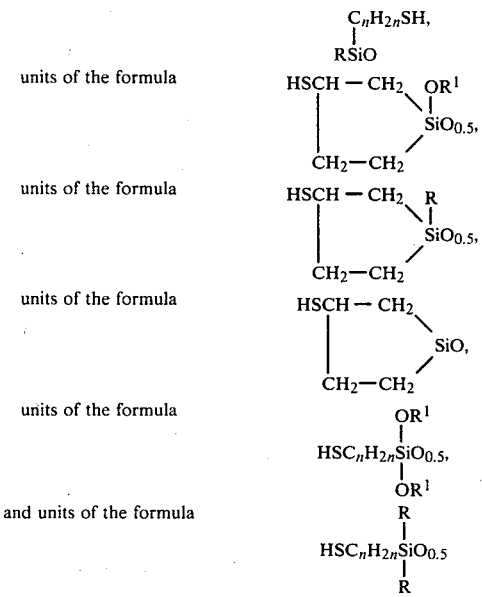

wherein: R is a monovalent radical selected from the group consisting of alkyl radicals of from 1 to 3 carbon atoms inclusive and phenyl radical; $R^1$ is a monovalent radical selected from the group consisting of alkyl radicals of from 1 to 3 carbon atoms inclusive; and n has a value of from 1 to 4 inclusive, there being in said mercaptoorganopolysiloxane an average of at least two sulfur-containing siloxane units per molecule, but not more than 10 mole percent sulfur-containing units based upon the total number of siloxane units in the mercaptoorganopolysiloxane;

(B) an aliphatically unsaturated polydiorganosiloxane having at least three diorganosiloxane units per molecule wherein each unit of the combination forming the molecule is selected from the group consisting of units of the formula

units of the formula

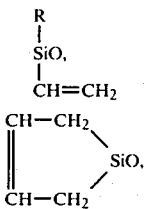

and units of the formula

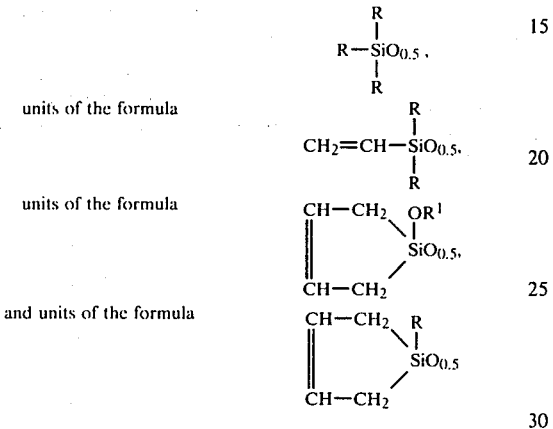

any endblocking units present being selected from the group consisting of units of the formula $$R-SiO_{0.5}$$ with R substituents, units of the formula $$CH_2=CH-SiO_{0.5}$$ with R substituents, units of the formula (cyclic CH—CH₂ with OR¹, SiO₀.₅)

and units of the formula (cyclic CH—CH₂ with R, SiO₀.₅)

wherein R and R¹ are as defined above, there being at least two aliphatically unsaturated siloxane units per molecule;

(C) an organic peroxide in an amount equal to from about 0 to about 10 parts by weight per 100 parts of the combined weight of (A) and (B);

(D) a filler in an amount equal to from about 0 to about 200 parts by weight per 100 parts of the combined weight of (A) and (B); and (E) a carboxylic acid salt of a transition metal selected from the group consisting of iron, manganese and nickel in an amount equal to from about 0.01 to about 5 parts by weight per 100 parts of the combined weight of (A) and (B).

Incorporated by reference herein is applicants' U.S. patent application Ser. No. 06/099,298, allowed filed concurrently herewith and entitled "Mercaptoorganopolysiloxane Elastomers Catalyzed by Metallic Compounds in the Presence of Peroxides".

The mercaptoorganopolysiloxanes which are useful in the practice of the present invention include those consisting essentially of dimethylsiloxane units, trimethylsiloxane units, hydroxydimethylsiloxane units, and units represented by the formulas:

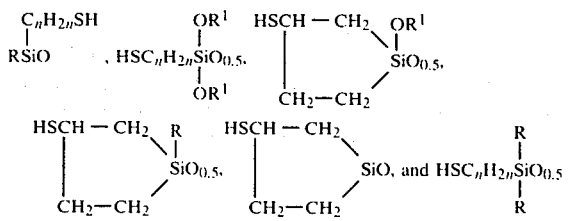

wherein: R is a monovalent radical selected from the group consisting of alkyl radicals of from 1 to 3 carbon atoms inclusive (such as methyl, ethyl or propyl) and phenyl radical; R¹ is selected from the group consisting of alkyl radicals having 1 to 3 carbon atoms (such as methyl, ethyl and propyl); and n has a value of from 1 to 4 inclusive, there being present in such mercaptoorganopolysiloxane an average of at least two mercapto-containing siloxane units per molecule and no more than 10 mole percent mercapto-containing units based upon the total units in the mercaptoorganopolysiloxane.

Examples of the mercaptoorganopolysiloxanes include those having "terminal" mercapto groups such as those represented by the formulas I through IV:

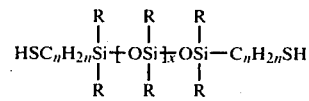 I

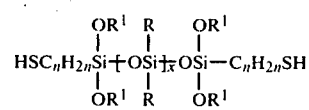 II

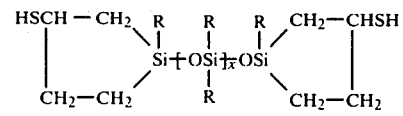 III

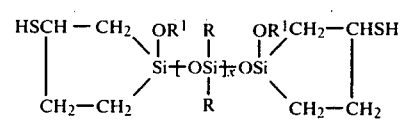 IV wherein R, R¹ and n are as defined above and x has a value of from about 18 to about 1000 and preferably about 200 to about 800, and those having pendent mercapto groups such as those represented by formulas V through VIII:

 V

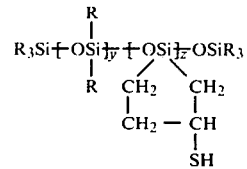 VI

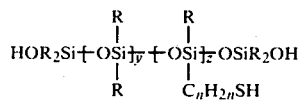 VII

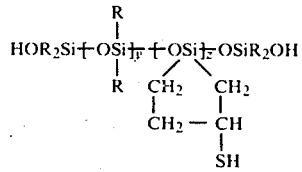 VIII wherein n and R are as above; y+z has a value of from about 18 to about 1000 and preferably about 200 to about 800, and z is at least 2 and no more than a number providing 10 mole percent mercapto-containing siloxane units, based on total siloxane units in the polymer.

The mercaptoorganopolysiloxanes of formulas I and V are known in the art as evidenced by the prior art cited herein. The mercaptosilacyclopentylpolysiloxanes of formulas III and VI and their position isomers can be prepared by the method defined in U.S. Pat. No. 3,655,713, which is hereby incorporated by reference to show the mercaptosilacyclopentylpolysiloxanes and their preparation. The mercaptoorganopolysiloxanes of formula II which contain endblocking units of the formula:

$$\text{HSC}_n\text{H}_{2n}\underset{\underset{\text{OR}^1}{|}}{\overset{\overset{\text{OR}^1}{|}}{\text{Si}}}\text{O}_{0.5}$$

can be prepared by reacting a hydroxyl endblocked polydimethylsiloxane and a mercaptoalkyltrialkoxysilane of the formula:

$$\text{HSC}_n\text{H}_{2n}\text{Si}(\text{OR}^1)_3$$

in the presence of solid potassium hydroxide or potassium silanolate catalysts. The potassium silanolate catalyst is preferred for the higher viscosity polydimethylsiloxanes. The mercaptoalkyltrialkoxysilane is preferably used in excess of about 10 mole percent over stoichiometric amounts. The resulting product is essentially a polydimethylsiloxane endblocked with units of the formula:

$$\text{HSC}_n\text{H}_{2n}\underset{\underset{\text{OR}^1}{|}}{\overset{\overset{\text{OR}^1}{|}}{\text{Si}}}\text{O}_{0.5}$$

There may be some small amounts of units wherein two SiOH groups have reacted with one mercaptoalkyltrialkoxysilane molecule, but these amounts are small enough that the character of the endblocked polydimethylsiloxane is not noticeably altered.

The aliphatically unsaturated polydiorganosiloxanes which are useful in the practice of the present invention include those having at least three diorganosiloxane units per molecule wherein each unit of a combination forming the molecule is selected from the group consisting of units of the formula units of the formula 
$$\underset{\underset{\text{R}}{|}}{\overset{\overset{\text{R}}{|}}{\text{SiO}}},$$

units of the formula 
$$\underset{\underset{\text{CH}=\text{CH}_2}{|}}{\overset{\overset{\text{R}}{|}}{\text{SiO}}},$$

and units of the formula 

any endblocking siloxane units present being selected from the group consisting of units of the formula units of the formula 
$$\text{R}-\underset{\underset{\text{R}}{|}}{\overset{\overset{\text{R}}{|}}{\text{Si}}}\text{O}_{0.5},$$

units of the formula 
$$\text{CH}_2=\text{CH}-\underset{\underset{\text{R}}{|}}{\overset{\overset{\text{R}}{|}}{\text{Si}}}\text{O}_{0.5},$$

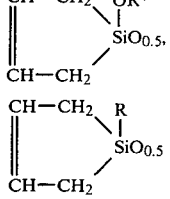

and units of the formula 
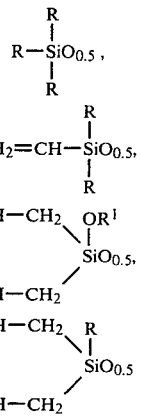

wherein R and $R^1$ are as defined above, there being at least two aliphatically unsaturated siloxane units per molecule.

Examples of the aliphatically unsaturated polydiorganosiloxanes include those having "terminal" unsaturated groups such as those represented by formulas IX through XI

  IX

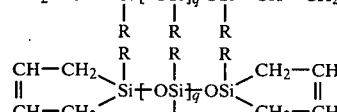  X

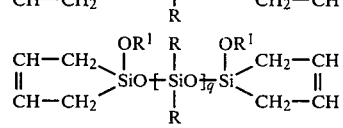  XI wherein R and $R^1$ are as defined above and q has a value from about 1 to about 1000 and preferably from about 200 to about 800, and those having "pendent" unsaturated groups such as those represented by formulas XII and XIII

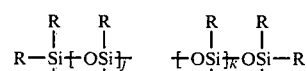  XII

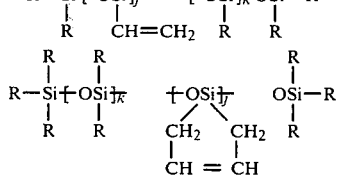  XIII wherein: R is as defined above; the sum of j and k has a value of from about 2 to about 1000 and preferably from about 200 to about 800; and j is at least 2. Also included are cyclic aliphatically unsaturated polydiorganosiloxanes such as those represented by the formula, $$\left[\underset{\underset{\text{CH}=\text{CH}_2}{|}}{\overset{\overset{\text{R}}{|}}{\text{SiO}}}\right]_p$$  XIV wherein: R is as defined above and is preferably methyl and p has a value of from 3 to 6 inclusive.

While compositions including mixtures of mercaptoorganopolysiloxanes of any of formulas I through VIII with aliphatically unsaturated polydiorganosiloxanes of any of formulas IX through XIV are useful, if the mercaptoorganopolysiloxanes employed are substantially exclusive of the types represented by formulas I through IV (i.e., have terminal groups), then it is preferred that the aliphatically unsaturated polydiorganosiloxanes be of the types represented by formulas XII through XIV (have pendent unsaturated groups).

Suitable metal salts of carboxylic acids can be represented by the formula,

wherein: T is a metal selected from the group consisting of iron, manganese, and nickel, $R^2$ is a monovalent acyl radical: and m is from 2 to 4 depending upon the oxidation state of T. Suitable monovalent acyl radicals include acetyl, propionyl, isobutyryl, stearoyl, lauroyl, 2-ethylhexanoyl (sometimes referred to as "octanoyl"), oleoyl, linoleoyl, benzoyl, naphthoyl, $\beta$-benzoyl-propionyl, crotonoyl, atropoyl, palmitoyl, and cinnamoyl. The 2-ethylhexanoyl, ("octanoyl") radical is the preferred acyl radical. The most preferred catalyst is ferric octoate.

The curable compositions of the present invention containing a mercaptoorganopolysiloxane, an aliphatically unsaturated polydiorganosiloxane and the metal salt of a carboxylic acid can be cured by exposure to atmospheric oxygen. Accelerated cures are obtained if an optional organic peroxide is included in the curable composition. In that case, the compositions cure quickly in thick sections shortly after formulation.

Organic peroxides which are suitable for the practice of the present invention include 2,4-dichlorobenzoyl peroxide, tertiary-butyl perbenzoate, benzoyl peroxide, tertiary-butyl peroctoate, paramethane hydroperoxide, tertiary-butyl hydroperoxide, cumene hydroperoxide and the like.

Fillers can be used in the compositions of this invention, but are not required. The fillers can be both treated and untreated reinforcing fillers, such as fume silica and fume silica having triorganosiloxy groups, (e.g., trimethylsiloxy groups) on the surface, carbon black or precipitated silica, and extending fillers such as crushed or ground quartz, diatomaceous earth, and calcium carbonate.

While not intended to be limiting upon the scope of the present invention, it is thought that the curable compositions may crosslink by two different mechanisms, one of which involves the formation of monosulfide bonds while the other involves the formation of disulfide bonds. It is thought that the monosulfide bonds are more stable than the disulfide bonds are further that the ratio of monosulfide bonds to disulfide bonds can be influenced by varying the mole ratios of the various constituents with respect to each other.

Curable compositions having desirable properties are thus formed when the mole ratio of aliphatically unsaturated groups to mercapto groups in the mixture of polymers (A) and (B) is from about 0.05/1 and to about 20/1, and preferably from 0.2/1 to 5/1. If the composition is to be cured with atmospheric oxygen at room temperature, desirable compositions are formed if the mole ratio of mercapto groups in polymer (A) to metal salt is from about 4/1 to about 250/1, and preferably 150/1 to 200/1. If the curable composition includes an organic peroxide, desirable compositions are formed if the mole ratio of mercapto groups in polymer (A) to metal salt is from about 4/1 to about 250/1, preferably 25/1 to 150/1, and the mole ratio of peroxide molecules to mercapto groups in polymer (A) is from about 0.05/1 to about 8/1, and preferably 0.4/1 to 1.5/1.

Mixtures of metal salts of carboxylic acids and peroxides tend to be unstable and therefore should not be mixed until shortly before use.

The following examples are presented for illustrative purposes and should not be construed as limiting the invention.

EXAMPLE 1 illustrates that a mixture of a representative mercaptoorganopolysiloxane and a representative aliphatically unsaturated polydiorganosiloxane does not cure spontaneously upon exposure to atmospheric oxygen.

EXAMPLE 1

Twenty-five grams of a methylphenylvinylsiloxy endblocked polydimethylsiloxane of the general formula IX, having a molecular weight of about 10,000, a viscosity of about 0.0004 m²/s at 25° C. and containing about 0.5 weight percent vinyl groups was mixed with an equal quantity of a mercaptoorganopolysiloxane of the general formula V and the average formula

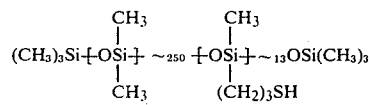

The latter polymer had a viscosity of about 0.00106 m²/s at 27° C. and a mercapto content of 2.25 weight percent—SH (or 0.068 moles—SH/100 g polymer) as determined by iodine titration. A portion of the formulation was poured into a covered container and stored at room temperature for two months without a change in viscosity. Another portion was poured into an open container which was placed in an oven at 150° C. and the following observations were made:

(1) After 6 hours the viscosity was virtually unchanged.

(2) After 20 hours, the sample was partially crosslinked with a tacky surface.

(3) After 28 hours, the surface was tackfree.

(4) After 72 hours, the sample was cured. This example is presented for comparative purposes.

The following Examples 2 through 6 illustrate the preparation of mixtures according to the invention which include ferric salts of carboxylic acids and which cure to elastomeric materials upon exposure to atmospheric oxygen.

EXAMPLE 2

Example 1 was repeated using 66.6 parts by weight of the methylphenylvinylsiloxy endblocked polydimethylsiloxane, 33.3 parts by weight of the mercaptoorganopolysiloxane, and 0.6 parts by weight of a 50 weight percent solution of ferric octoate in mineral oil. In the mixture so prepared, the ratio of parts of ferric salt to 100 parts unsaturated group-containing units in the polymer was 0.30; the molar ratio of unsaturated group-containing units to ferric salt (C=C/Fe) was 17/1; and the molar ratio of mercapto-containing units to unsaturated group-containing units (SH/C=C) was 2/1. The polymers were de-aired before mixing and blended in a sealed tube. After a sample of the mixture was extruded from the tube, a tack-free surface formed in about 15 minutes and cured to a thickness of 60 mils in three to four hours when exposed to the atmosphere at room temperature.

EXAMPLE 3

A series of three mixtures was prepared according to Example 2, but with the proportions of mercaptoorganopolysiloxane and vinyl-containing polymer altered to result in compositional SH/C=C ratios of 1.3/1, 1.0/1.0, and 0.8/1 respectively. Extruded samples exhibited tack-free surfaces when exposed to the atmosphere at room temperature in 45 minutes, 1½ hours, and about 2 hours respectively.

EXAMPLE 4

A series of five mixtures was prepared according to Example 2 but with the proportion of ferric octoate altered to result in C=C/Fe molar ratios of 103/1, 34/1, 8.5/1, 3.5/1, and 2.0/1 respectively. Extruded samples exhibited tack-free surfaces when exposed to the atmosphere at room temperature in about 3 hours, 30 minutes, 5 minutes, about 4 hours, and about 5 hours respectively.

EXAMPLE 5

A mixture was prepared using 100 parts by weight of the mercaptoorganopolysiloxane described in Example 1, 0.6 parts by weight of the ferric octoate solution and 3.6 parts by weight of a methylsilacyclopentenyl-disiloxane having approximately 25 weight percent —CH=CH— units. The mixture so prepared had an C=C/Fe ratio of 17/1 and an SH/C=C ratio of 2/1. The polymers were de-aired and mixed in a sealed tube. An extruded sample formed a skin in about 8 minutes and cured completely upon standing overnight at room temperature exposed to the atmosphere.

EXAMPLE 6

A mixture was prepared using 100 parts by weight of a methylsilacyclopentenyl endblocked polydimethylsiloxane polymer (having a viscosity of 0.000703 m²/s and approximately 0.58 weight percent —CH=CH— units), 64.7 parts by weight of the mercaptoorganopolysiloxane described in Example 1, and 0.6 parts by weight of the ferric octoate solution. The polymers were de-aired and mixed in a sealed tube. An extruded sample formed a tack-free surface in 8 hours and cured completely upon standing overnight at room temperature exposed to the atmosphere.

The following Examples 7 through 9 illustrate preparation of mixtures according to the invention which include manganese and nickel salts of carboxylic acids and which cure to elastomeric materials upon exposure to atmospheric oxygen.

EXAMPLE 7

One hundred grams of the methylphenylvinylsiloxy endblocked polymer described in Example 1 was mixed with 50 g of a mercaptoorganopolysiloxane of the general formula

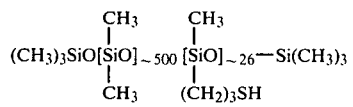

and 0.75 g manganese octoate (50% solution in mineral oil) in the manner of the previous examples. A skin formed on an extruded sample exposed to the atmosphere at room temperature in about 8 minutes. The skin was covered wih an oily film which was still present after 20 minutes even though the skin grew thicker. After four hours at room temperature the surface was tack-free.

EXAMPLE 8

Ten grams of the methylphenylvinylsiloxy endblocked polymer described in Example 1 was mixed with 5 g of the mercaptoorganopolysiloxane described in Example 1 and 0.2 g of the manganese octoate solution. An extruded sample exposed to the atmosphere cured to provide a tack-free surface upon standing overnight at room temperature.

EXAMPLE 9

The procedure of Example 7 was repeated using 20 g of the methylphenylvinylsiloxy endblocked polymer, 10 g of the mercaptoorganopolysiloxane and 0.5 g of nickel octoate (20% solution in mineral oil). After 24 hours at room temperature a surface skin of 40 mils had formed on an extruded sample exposed to the atmosphere. After six days the skin had thickened to approximately 80 mils.

Example 10 illustrates that a representative metal salt of a carboxylic acid is ineffective in promoting the curing of a representative aliphatically unsaturated polydiorganosiloxane alone in the presence of an organic peroxide and is presented for comparative purposes.

EXAMPLE 10

A mixture of 30 g of treated fume silica filler and 100 g of a methylphenylvinylsiloxy endblocked polydimethylsiloxane of the general formula IX, having a molecular weight of about 38,000, a viscosity of about 0.01004 m²/s at 25° C. and containing about 0.14 weight percent vinyl groups was prepared on a 3 roll mill. Twenty grams of this mixture was mixed with 0.5 g of ferric octoate (50% solution in mineral oil) and 0.1 g of 73% cumene hydroperoxide. A sample remained uncured after 15 minutes in a molding press at 100° C.

The following Examples 11 through 21 illustrate that a metal salt of a carboxylic acid is effective in enhancing the curing of mixtures of mercaptoorganopolysiloxanes and aliphatically unsaturated polydiorganosiloxanes in the presence of an organic peroxide.

EXAMPLE 11

Example 10 was repeated with the addition of 2.8 g of the mercaptoorganopolysiloxane described in Example 1 to the mixture of vinyl polymer, filler, peroxide and ferric octoate, providing a compositional SH/C=C ratio of 2.5. The sample began gelling within 1 to 2 minutes and was rapidly pressed into a molding chase and heat/press cured for 5 minutes at 100° C. to provide a cured elastomer with a tack-free surface. Physical properties of the sample are set out in Table I.

TABLE I

| | |
|---|---|
| Durometer (Shore A) | 23 |
| Tensile Strength (MPa) | 1.55 |
| Elongation At Break | 310% |
| Modulus at 100% elongation (MPa) | 0.38 |
| Modulus at 200% elongation (MPa) | 0.83 |
| Modulus at 300% elongation (MPa) | 1.48 |

EXAMPLE 12

Example 11 was repeated except that 0.5 g of the ferric octoate solution and 1.7 g of the mercaptoorganopolysiloxane was used. Properties of the heat/press cured mixture were as set out in Table II.

TABLE II

| | |
|---|---|
| Durometer (Shore A) | 20 |
| Tensile Strength (MPa) | 1.76 |
| Elongation At Break | 395% |
| Modulus at 100% elongation (MPa) | 0.34 |
| Modulus at 200% elongation (MPa) | 0.76 |
| Modulus at 300% elongation (MPa) | 1.24 |

EXAMPLE 13

Example 12 was repeated except that 0.05 g cumene hydroperoxide was used. Properties of a heat/press cured sample were as set out in Table III.

TABLE III

| | |
|---|---|
| Durometer (Shore A) | 21 |
| Tensile Strength (MPa) | 2.00 |
| Elongation At Break | 430% |
| Modulus at 100% elongation (MPa) | 0.34 |
| Modulus at 200% elongation (MPa) | 0.76 |
| Modulus at 300% elongation (MPa) | 1.24 |

EXAMPLE 14

One hundred grams of the methylphenylvinylsiloxy endblocked polydimethylsiloxane described in Example 10 was mixed with 10 g ferric octoate solution and 10 g cumene hydroperoxide. Fifteen grams of the resulting mixture was combined with 2.1 g of mercaptoorganopolysiloxane described in Example 1. A portion was cold press molded at 22° C. for 10 minutes and formed a clear and colorless elastomer with a tack-free surface.

EXAMPLE 15

Example 14 was repeated except that 0.5 g ferric octoate solution and 0.5 g cumene hydroperoxide was used. Again, a tack-free clear elastomer was formed after cold press molding at 22° C. for 10 minutes.

EXAMPLE 16

Example 15 was repeated except that 0.1 g cumene hydroperoxide was used, and yielded a tack-free elastomer after 5 minutes at 22° C. in a cold press mold.

EXAMPLE 17

Ten grams of the methylphenylvinylsiloxy endblocked polymer described in Example 1 was mixed with 0.5 g ferric octoate solution and 0.2 g t-butylperbenzoate. To the mixture was added 5.0 g of the mercaptoorganopolysiloxane as described in Example 1. An extruded sample began gelling in 45 seconds and was completely cured with a tack-free surface in 10 minutes at room temperature.

EXAMPLE 18

Example 8 was repeated with the exception that manganese octoate solution was added to 10 g of the mixture of vinyl-containing and mercapto-containing polymers with 0.2 g of cumene hydroperoxide. In a series of four compoundings, manganese octoate solution was added in amounts of 0.2 g, 0.1 g, 0.03 g and 0.05 g. All samples cured with a tack-free surface upon standing overnight at room temperature.

EXAMPLE 19

A series of three mixtures was prepared employing varying quantities of manganese octoate solution and cumene hydroperoxide. In each mixture, 100 g of the methylphenylvinylsiloxy endblocked polymer described in Example 10 was combined with the ferric salt and the cumene hydroperoxide and 15 g of the resulting mixture was combined with 5 g of the mercaptoorganopolysiloxane described in Example 1. The quantities of manganese octoate solution and cumene hydroperoxide in the four mixtures were:

| Mixture No. | Manganesee Octoate | Cumene Hydroperoxide |
|---|---|---|
| 1 | 0.5g | 0.1g |
| 2 | 0.1g | 0.1g |
| 3 | 0.5g | 0.5g |

The resulting mixtures were press molded for 40 minutes at 22° C. All three mixtures cured to elastomeric materials.

EXAMPLE 20

Ten grams of the methylphenylvinylsiloxy endblocked polymer described in Example 10 was mixed with 0.2 g of the manganese octoate solution, 0.2 g cumene hydroperoxide and 1.4 g of the mercaptoorganopolysiloxane described in Example 1. A sample heated to 200° C. for 3 minutes cured to a thickness of ¼ inch but had a slightly tacky surface.

EXAMPLE 21

Example 9 was repeated with 0.1 g cumene hydroperoxide added to the polymer/nickel octoate mixture. The center of an extruded sample exposed to the atmosphere was cured after 2 minutes while a surface layer of about 20 mils remained uncured. After 5 minutes the surface was cured but still tacky. The surface was tack-free upon standing overnight at room temperature.

Numerous modifications and variations in the practice of the invention are expected to occur to those skilled in the art upon consideration of the foregoing description and only such limitations as appear in the appended claims should be placed thereon.

What is claimed is:

1. A composition of matter comprising a material prepared by mixing
   (A) a mercaptoorganopolysiloxane consisting essentially of a combination of units selected from dimethylsiloxane units, hydroxydimethylsiloxane units, trimethylsiloxane units, units of the formula

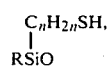

-continued units of the formula 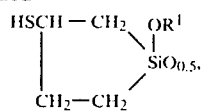

units of the formula 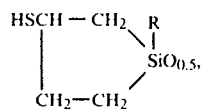

units of the formula 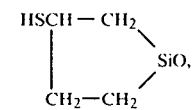

units of the formula 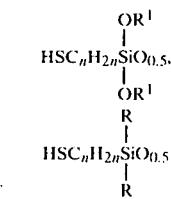

and units of the formula 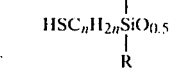

wherein: R is a monovalent radical selected from the group consisting of alkyl radicals of from 1 to 3 carbon atoms inclusive and phenyl radical; $R^1$ is a monovalent radical selected from the group consisting of alkyl radicals of from 1 to 3 carbon atoms inclusive; and n has a value of from 1 to 4 inclusive, there being in said mercaptoorganopolysiloxane an average of at least two sulfur-containing siloxane units per molecule, but not more than 10 mole percent sulfur containing units based upon the total number of siloxane units in the mercaptoorganopolysiloxane;

(B) an aliphatically unsaturated polydiorganosiloxane having at least three diorganosiloxane units per molecule wherein each unit of the combination forming the molecule is selected from the group consisting of units of the formula units of the formula 

and units of the formula 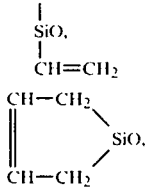

any endblocking units present being selected from the group consisting of units of the formula units of the formula 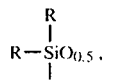

units of the formula 

units of the formula 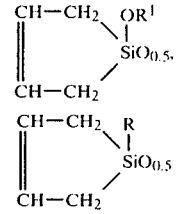

and units of the formula wherein R and $R^1$ are as defined above, there being at least two aliphatically unsaturated siloxane units per molecule;

(C) an organic peroxide in an amount equal to from about 0 to about 10 parts by weight per 100 parts of the combined weight of (A) and (B);

(D) a filler in an amount equal to from about 0 to about 200 parts by weight per 100 parts of the combined weight of (A) and (B); and (E) a carboxylic acid salt of a metal selected from the group consisting of iron, manganese and nickel in an amount equal to from about 0.01 to about 5 parts by weight per 100 parts of the combined weight of (A) and (B).

2. The curable composition of claim 1 further characterized in that the sulfur-containing siloxane units are terminal mercapto groups and the aliphatically unsaturated groups of the aliphatically unsaturated polydiorgano siloxane are present as units of the formula

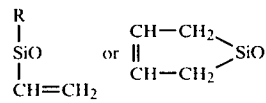

3. The curable composition of claim 1 wherein said metal salt of a carboxylic acid is selected from the group consisting of ferric octanoate, manganese octanoate, and nickel octanoate.

4. The curable composition of claim 3 wherein said metal salt of a carboxylic acid is ferric octanoate.

5. The curable composition of claim 2 wherein said metal salt of a carboxylic acid is selected from the group consisting of ferric octanoate, manganese octanoate and nickel octanoate.

6. The curable composition of claim 5 wherein said metal salt of a carboxylic acid is ferric octanoate.

* * * * *